(12) United States Patent
Gomi et al.

(10) Patent No.: US 8,031,945 B2
(45) Date of Patent: Oct. 4, 2011

(54) IMAGE-PROCESSING DEVICE, IMAGE-PROCESSING METHOD, PROGRAM OF IMAGE-PROCESSING METHOD, AND RECORDING MEDIUM RECORDING PROGRAM OF IMAGE-PROCESSING METHOD

(75) Inventors: Shinichiro Gomi, Chiba (JP); Yusuke Nakamura, Tokyo (JP); Masami Ogata, Kanagawa (JP)

(73) Assignee: Sony Corporation, Tokyo (JP)

( * ) Notice: Subject to any disclaimer, the term of this patent is extended or adjusted under 35 U.S.C. 154(b) by 964 days.

(21) Appl. No.: 11/954,781

(22) Filed: Dec. 12, 2007

(65) Prior Publication Data

US 2008/0152240 A1 Jun. 26, 2008

(30) Foreign Application Priority Data

Dec. 20, 2006 (JP) ................ P2006-342440

(51) Int. Cl.
*G06K 9/48* (2006.01)

(52) U.S. Cl. ........ 382/199; 382/275; 382/128; 382/268; 382/238; 382/261; 382/154; 348/241; 348/243; 348/244; 348/251; 348/441; 375/240.03; 375/240.27

(58) Field of Classification Search .......... 382/199, 382/275, 128, 268, 238, 261, 154, 233; 348/241–244, 251, 441, 445, 746–747; 375/240.03, 375/240.27
See application file for complete search history.

(56) References Cited

U.S. PATENT DOCUMENTS 7,379,626 B2 * 5/2008 Lachine et al. ............... 382/300

FOREIGN PATENT DOCUMENTS

| JP | 10-248026 | 9/1998 |
|---|---|---|
| JP | 2001-076175 | 3/2001 |
| JP | 2002-335400 | 11/2002 |
| JP | 2004-266757 | 9/2004 |
| JP | 2005-051379 | 2/2005 |
| JP | 2008-310117 | 12/2008 |

* cited by examiner

*Primary Examiner* — Matthew Bella
*Assistant Examiner* — Mike Rahmjoo
(74) *Attorney, Agent, or Firm* — Finnegan, Henderson, Farabow, Garrett & Dunner LLP

(57) ABSTRACT

An image-processing device including a pulverization-core unit configured to divide input-image data into blocks, generate basic blocks by reducing each of the blocks in size, and arrange the basic blocks into the blocks so that processed-image data including at least one noise particle of the input-image data is generated, where the noise particle included in the processed-image data is reduced in size, an edge-detection unit configured to detect an edge degree from the input-image data, and an edge-blend unit configured to subject a pixel value of the input-image data and a pixel value of the processed-image data to load addition and output output-image data based on the detection result so that a weight to the pixel value of the input-image data increases as the edge degree increases is provided.

6 Claims, 9 Drawing Sheets

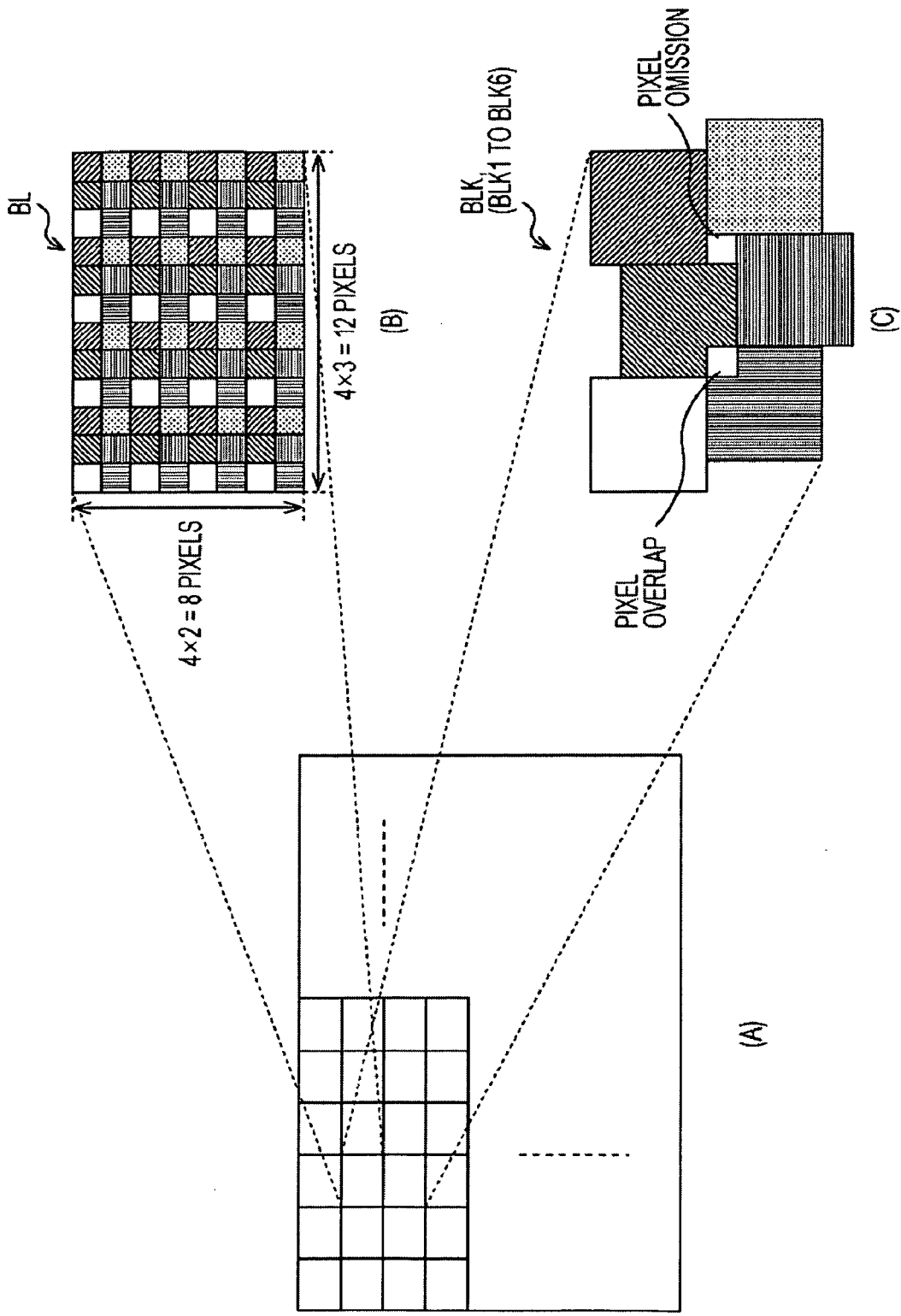

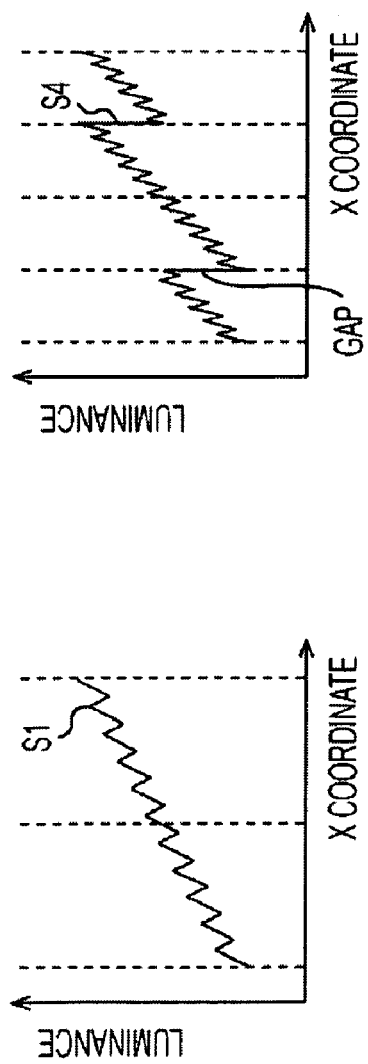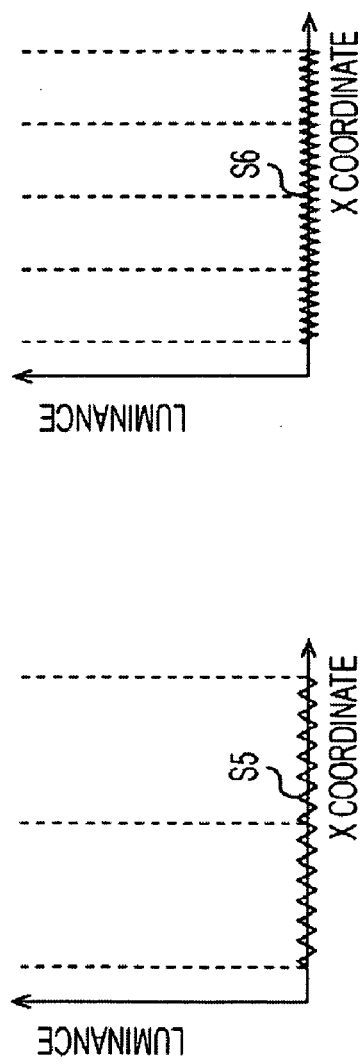

FIG. 5

|   |   |   |   |   |
|---|---|---|---|---|
|   |   |   |   |   |
|   |   |   |   |   |
| -1 | 0 | 0 | 0 | 1 |
|   |   |   |   |   |
|   |   |   |   |   |

FIG. 6

|   |   |   |   |   |
|---|---|---|---|---|
|   |   | -1 |   |   |
|   |   | 0 |   |   |
|   |   | 0 |   |   |
|   |   | 0 |   |   |
|   |   | 1 |   |   |

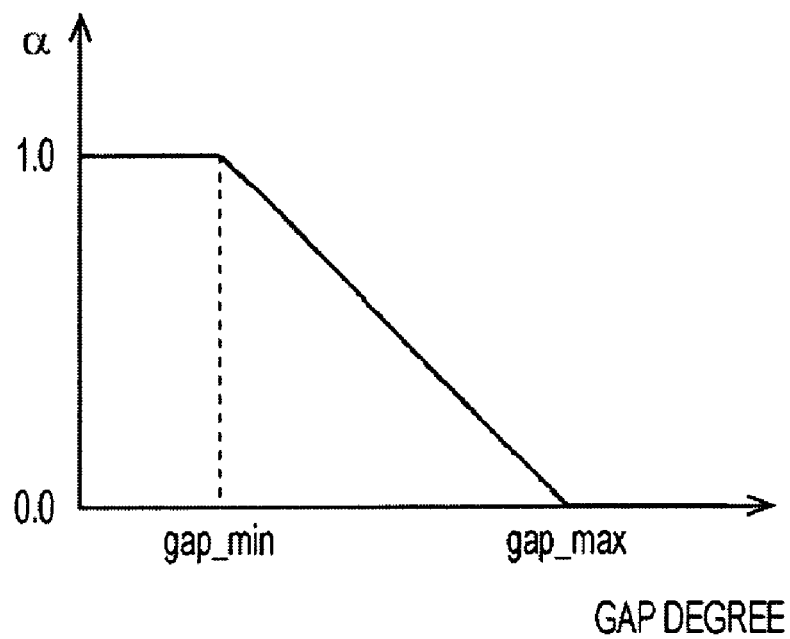

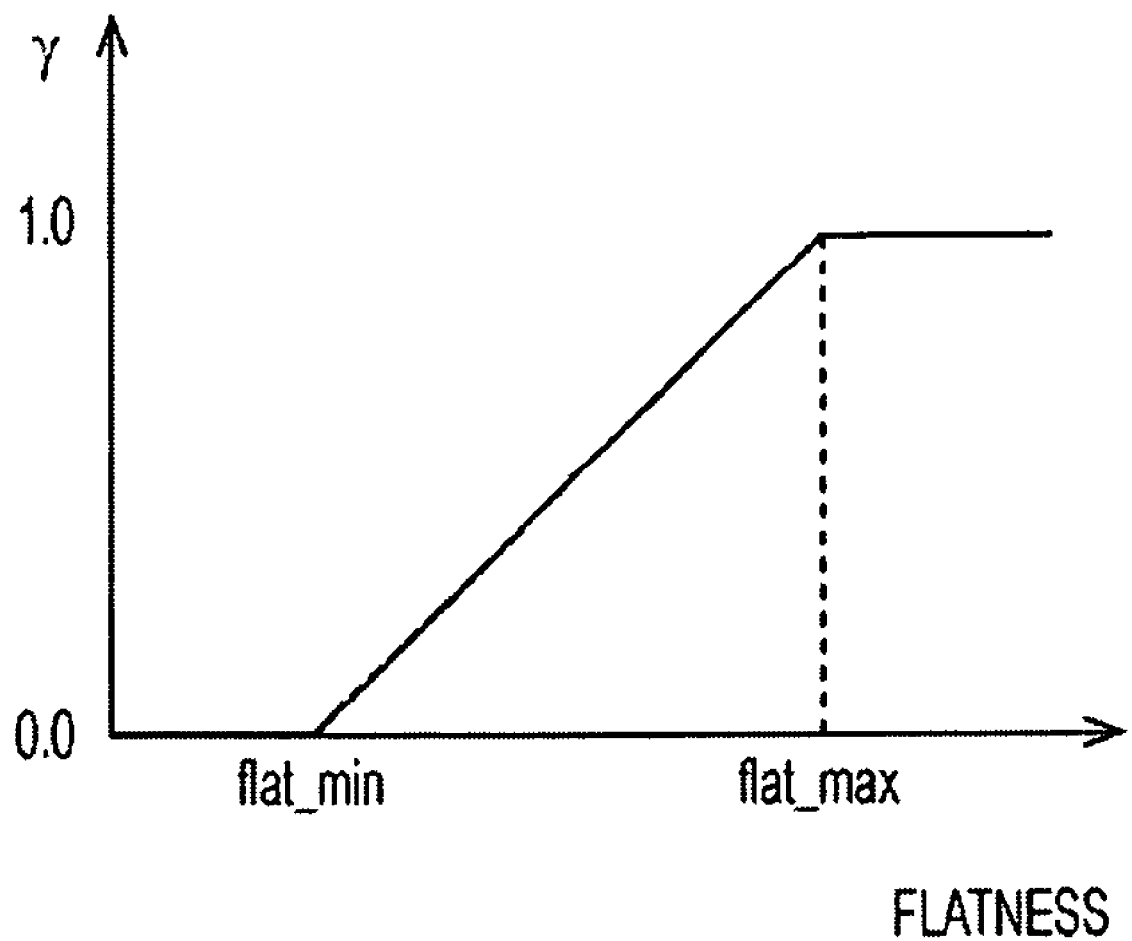

IMAGE-PROCESSING DEVICE, IMAGE-PROCESSING METHOD, PROGRAM OF IMAGE-PROCESSING METHOD, AND RECORDING MEDIUM RECORDING PROGRAM OF IMAGE-PROCESSING METHOD

CROSS REFERENCES TO RELATED APPLICATIONS

The present invention contains subject matter related to Japanese Patent Application JP 2006-342440 filed in the Japanese Patent Office on Dec. 20, 2006, the entire contents of which are incorporated herein by reference.

BACKGROUND OF THE INVENTION

1. Field of the Invention

The present invention is used for a video apparatus and/or device including a display device or the like, for example. In the video apparatus and/or device, input-image data is divided into blocks, each of the blocks is reduced in size so that basic blocks are generated, and the basic blocks are arranged into the original blocks so that each of noise particles is reduced in size. Subsequently, noises become more unnoticeable than ever.

2. Description of the Related Art

In the past, various types of video apparatuses and/or devices including the display device or the like are configured to remove noises from a video signal by using a two-dimensional low-pass filter, a time-recursive filter, etc. Japanese Unexamined Patent Application Publication No. 10-248026 discloses the idea of removing noises by using the time-recursive filter, for example.

However, in the case where the two-dimensional low-pass filter is used to remove noises even though the energy of the noise components is decreased, noise components with low space frequencies may be left. The noise components with the low space frequencies are displayed, as flat and large particles, so that the quality of a displayed screen image is deteriorated.

Further, in the case where the time-recursive filter is used to remove the noises, noise components making small movements are left and displayed, as small-moving noise particles, so that the quality of the displayed screen image is deteriorated.

Noise components removed with difficulty through noise-removal processing performed by using the above-described two-dimensional low-pass filter and time-recursive filter become noticeable when the number of pixels of a video signal generated under the Standard Definition Television (SDTV) system is increased and the format of the video signal is converted into that of a video signal generated under the High Definition Television (HDTV) system, for example.

SUMMARY OF THE INVENTION

Accordingly, the present invention has been achieved to propose an image-processing device, an image-processing method, a program of the image-processing method, and a recording medium recording the program of the image-processing method that can make noises more unnoticeable than ever.

An image-processing device according to an embodiment of the present invention includes a pulverization-core unit configured to divide data on an input image into blocks, generate basic blocks by reducing each of the blocks in size, and arrange the basic blocks into the blocks so that data on a processed image including at least one noise particle of the input-image data is generated, where the noise particle included in the processed-image data is reduced in size, an edge-detection unit configured to detect the edge degree from the input-image data, and an edge-blend unit configured to subject a pixel value of the input-image data and a pixel value of the processed-image data to load addition and output data on an output image based on a result of the detection performed by the edge-detection unit so that a weight to the pixel value of the input-image data increases as the edge degree increases.

An image-processing method according to another embodiment of the present invention includes the steps of dividing data on an input image into blocks, generating basic blocks by reducing each of the blocks in size, and arranging the basic blocks into the blocks so that data on a processed image including at least one noise particle of the input-image data is generated, where the noise particle included in the processed-image data is reduced in size, detecting an edge degree from the input-image data, and subjecting a pixel value of the input-image data and a pixel value of the processed-image data to load addition and outputting data on an output image based on a result of the detection performed at the edge-detection step so that a weight to the pixel value of the input-image data increases as the edge degree increases.

A program of an image-processing method provided to process data on an input image constitutes another embodiment of the present invention. The program includes the steps of dividing the input-image data into blocks, generating basic blocks by reducing each of the blocks in size, and arranging the basic blocks into the blocks so that data on a processed image including at least one noise particle of the input-image data is generated, where the noise particle included in the processed-image data is reduced in size, detecting an edge degree from the input-image data, and subjecting a pixel value of the input-image data and a pixel value of the processed-image data to load addition and outputting data on an output image based on a result of the detection performed at the edge-detection step so that a weight to the pixel value of the input-image data increases as the edge degree increases.

A recording medium recording a program of an image-processing method provided to process data on an input image constitutes another embodiment of the present invention. The program includes the steps of dividing the input-image data into blocks, generating basic blocks by reducing each of the blocks in size, and arranging the basic blocks into the blocks so that data on a processed image including at least one noise particle of the input-image data is generated, where the noise particle included in the processed-image data is reduced in size, detecting an edge degree from the input-image data, and subjecting a pixel value of the input-image data and a pixel value of the processed-image data to load addition and outputting data on an output image based on a result of the detection performed at the edge-detection step so that a weight to the pixel value of the input-image data increases as the edge degree increases.

According to the above-described configurations, the basic blocks generated by reducing each of the blocks in size are arranged, whereby the input-image data is processed so that each of the noise particles is reduced in size and the processed-image data is generated. After that, the pixel value of the input-image data and the pixel value of the processed-image data are subjected to the load addition and the output-image data is generated so that the weight to the pixel value of the input-image data increases as the edge degree increases. Subsequently, the output-image data generated in the above-described manner stores the edge information and the size of each of the noise particles included in the output-image data is smaller than ever, which makes it possible to make noises more unnoticeable than ever.

Thus, it becomes possible to make noises more unnoticeable than ever according to an embodiment of the present invention.

BRIEF DESCRIPTION OF THE DRAWINGS

FIG. 3 is a schematic diagram illustrating operations different from those illustrated in FIG. 2;

FIG. 4A is a characteristic-line graph illustrating operations of a pulverization-core unit of the image-processing device illustrated in FIG. 1;

FIG. 4B is a characteristic-line graph illustrating other operations of the pulverization-core unit;

FIG. 4C is a characteristic-line graph illustrating other operations of the pulverization-core unit;

FIG. 4D is a characteristic-line graph illustrating other operations of the pulverization-core unit;

FIG. 4E is a characteristic-line graph illustrating other operations of the pulverization-core unit;

FIG. 5 shows the characteristics of a horizontal-direction filter of a gap-detection unit of the image-processing device illustrated in FIG. 1;

FIG. 6 shows the characteristics of a vertical-direction filter of the gap-detection unit;

FIG. 7 is a characteristic-line graph illustrating operations of a blend-ratio-generation unit provided in a gap-control unit of the image-processing device illustrated in FIG. 1;

FIG. 8 is a schematic diagram showing the characteristics of a horizontal-direction filter of an edge-detection unit of the image-processing device illustrated in FIG. 1;

FIG. 13 is a characteristic-line graph illustrating operations performed by another blend-ratio-generation unit of the image-processing device shown in FIG. 1 based on the flatness.

DESCRIPTION OF THE PREFERRED EMBODIMENTS

Embodiments of the present invention will be described in detail with reference to the attached drawings.

First Embodiment (1) Configuration of First Embodiment

Figure 1:
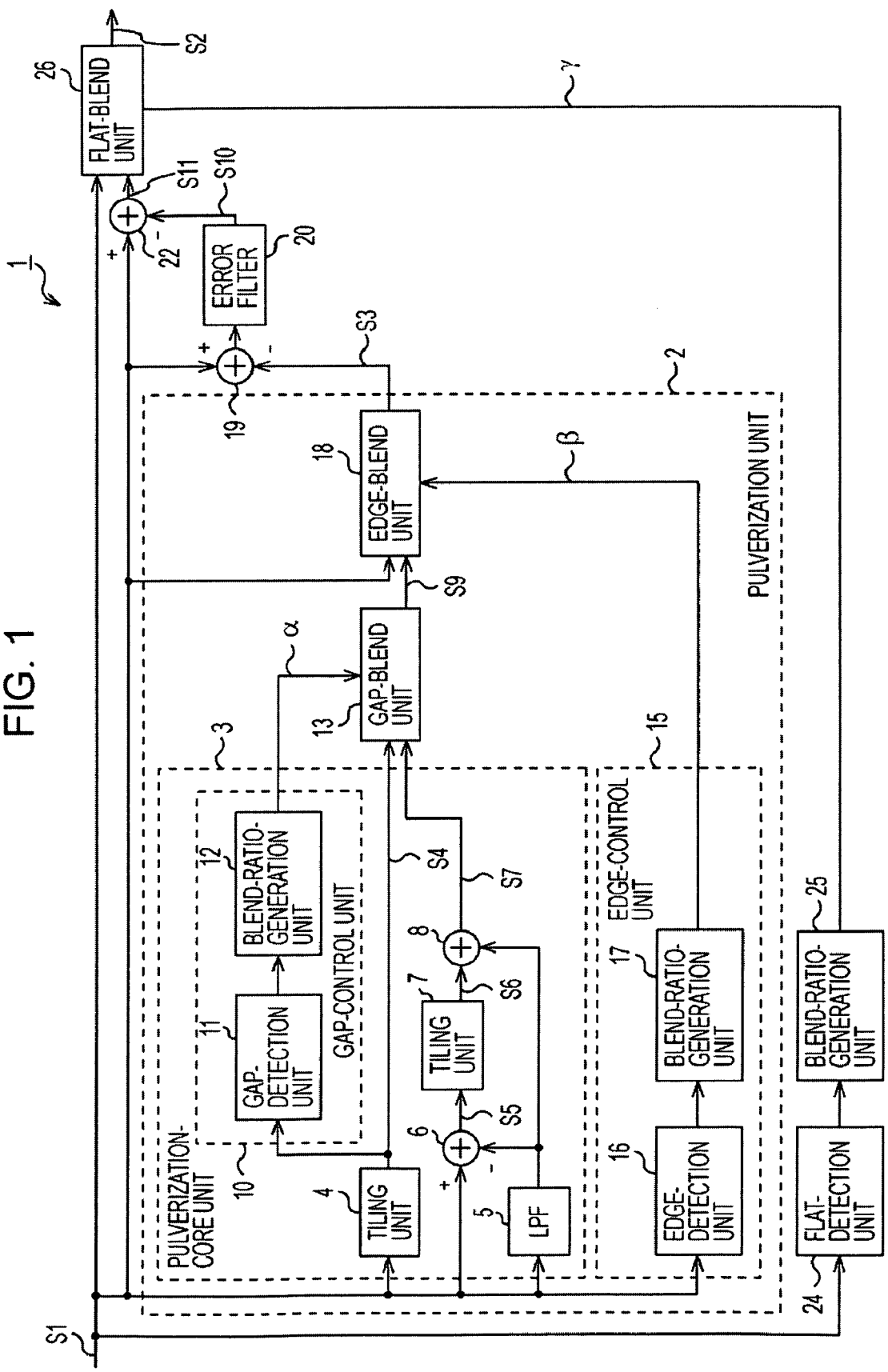
FIG. 1 is a block diagram illustrating an image-processing device according to an embodiment of the present invention.

FIG. 1 is a block diagram illustrating an image-processing device 1 according to a first embodiment of the present invention. The image-processing device 1 is included in various types of video apparatuses and/or devices such as a display device and configured to make the noise of an input-video signal S1 unnoticeable and generate an output-video signal S2. Hereinafter, a processing system including the image-processing device 1 is determined to be the first system and only a luminance signal of the input-video signal S1 is processed by the image-processing device 1. However, the image-processing device may perform processing by using three processing systems so that the luminance signal and a color-difference signal are processed through the three processing systems. Further, color signals included in a primary-color signal and a complementary-color signal may be processed through the three processing systems.

In the image-processing device 1, a pulverization unit 2 processes the input-video signal S1, so as to reduce each of noise particles in size, whereby noises become unnoticeable. Therefore, a pulverization-core unit 3 provided in the pulverization unit 2 performs processing, so as to reduce the size of each of the noise particles of the input-video signal S1.

Namely, in the pulverization-core unit 3, a tiling unit 4 divides input-image data generated based on the input-video signal S1 into blocks and reduces each of the blocks in size so that basic blocks are generated. Further, the pulverization-core unit 3 rearranges the basic blocks into the original blocks, so as to reduce the size of each of noise particles and make the noises unnoticeable.

Figure 2:
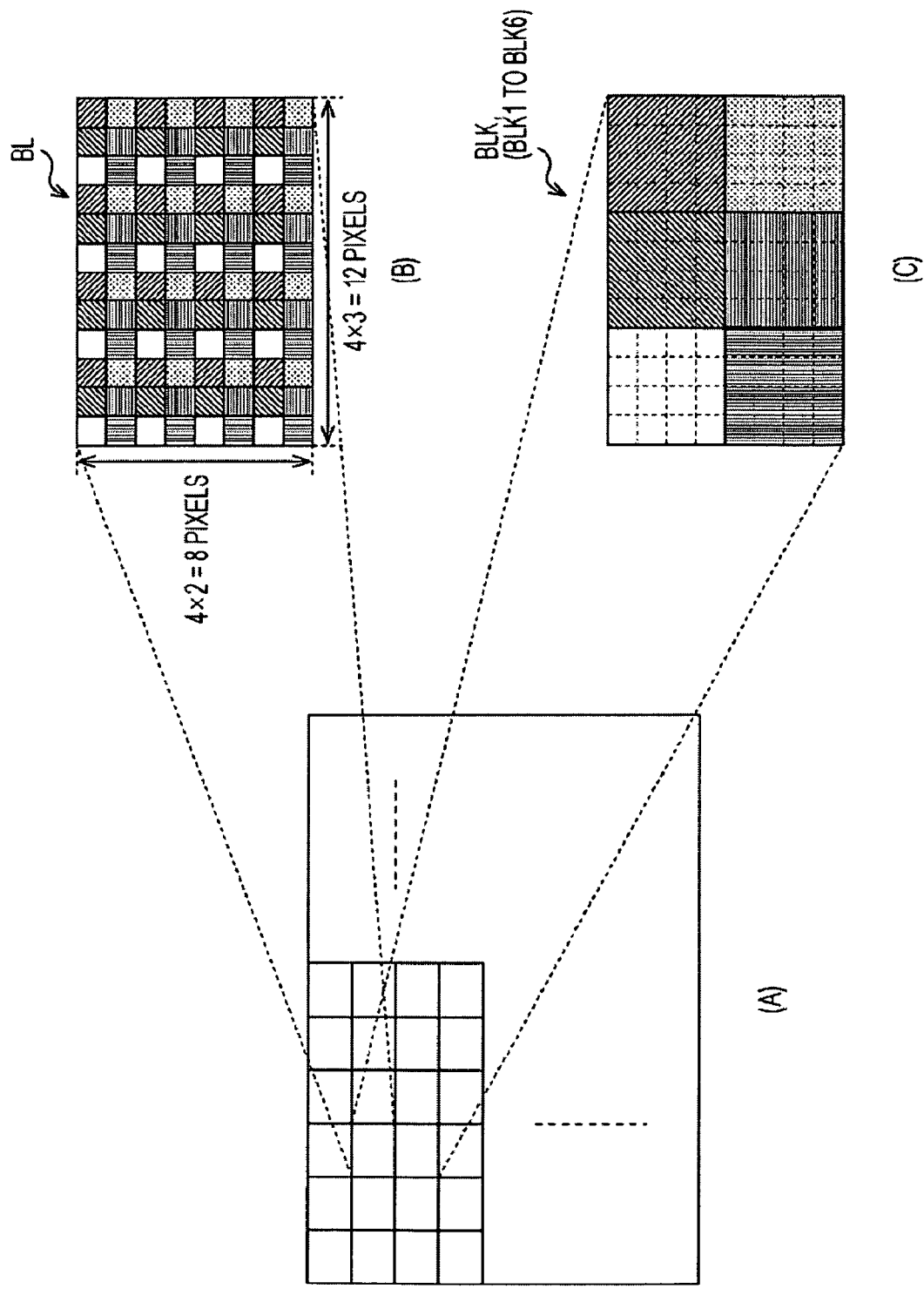
FIG. 2 is a schematic diagram illustrating operations of a tiling unit of the image-processing device illustrated in FIG. 1.

More specifically, as shown in Parts (A) and (B) of FIG. 2, the tiling unit 4 equally divides data on an input image generated based on the input-video signal S1 in a vertical direction and a horizontal direction so that a block BL is generated. The block BL includes a predetermined number of pixels arranged in the horizontal direction and a predetermined number of pixels arranged in the vertical direction. According to FIG. 2, the block BL includes eight pixels arranged in the vertical direction and twelve pixels arranged in the horizontal direction. The number of pixels included in each of the blocks BL can be determined in various ways, as required. Further, the input-image data may not be equally divided. Namely, the input-image data may be divided into blocks of variable sizes, as required, according to the flatness or the like of the input-image data. The above-described configuration is effective at increasing the size of the blocks corresponding to a flat portion as the flatness of the flat portion increases, for example.

Further, the tiling unit 4 reduces each of the blocks BL by thinning out the pixels of each of the blocks BL so that six different types of basic blocks BLK1, BLK2, BLK3, BLK4, BLK5, and BLK6 are generated, as shown by Part (C) of FIG. 2. Then, the tiling unit 4 rearranges the basic blocks BLK1 to BLK6 into the original blocks BL, and outputs a video signal S4. According to Part (C) of FIG. 2, of the pixels included in the original block BL, the pixel value is sampled every three pixels arranged in the horizontal direction and every two pixels arranged in the vertical direction so that the basic blocks BLK1 to BLK6 are generated, where the sampling positions corresponding to the basic blocks BLK1 to BLK6 are different from one another. Then, the basic blocks BLK1 to BLK6 are arranged so that they are adjacent to one another, and correspond to the sampling positions on the original block BL made of the pixels generating the basic blocks BLK1 to BLK6. The interval between the times where the thinning-out processing is performed, the number of basic blocks to be generated, etc. may be determined in various ways, as required, or variable according to the flatness of each of the blocks BL, for example.

Instead of arranging the basic blocks BLK1 to BLK6 so that they are adjacent to one another, as shown in FIG. 2, the adjacent basic blocks BLK1 to BLK6 may be randomly displaced from one another in the horizontal direction and the vertical direction so that the borders between the basic blocks BLK1 to BLK6 become unnoticeable, as shown in FIG. 3. In that case, the average of values of the overlapping pixels of the adjacent basic blocks BLK is determined. Further, for a pixel-omission part where any one of the basic blocks BLK is not assigned, the values of pixels corresponding to the pixels of the original block, or the average value of pixel values of the basic blocks BLK surrounding the pixel-omission part may be assigned. The basic block BLK may be generated not only by thinning out the pixels, as described above, but also by reducing the size of the original block BL through filtering. When the basic blocks BLK are generated through the filtering, the number of basic blocks BLK arranged in the original block BL becomes smaller than in the case where the basic blocks BLK are generated through the thinning-out processing. Subsequently, it becomes difficult to entirely fill the original block with the basic blocks BLK. In that case, therefore, the same basic block BLK is arranged over and over again, so as to prevent the occurrence of a clearance.

The tiling unit 4 rearranges the basic blocks BLK and outputs the video signal S4. Here, if the basic blocks BLK are rearranged and a luminance gradient occurs in the horizontal direction or the like in the input-image data generated based on the input-video signal S1, as shown in FIG. 4A, the values of pixels arranged on the borders between the adjacent basic blocks BLK vary discontinuously so that the values of pixels arranged on the borders change abruptly, as shown in FIG. 4B. Hereinafter, the abrupt change in the pixel value is referred to as a gap, where the abrupt change occurs on the borders between the basic blocks BLK. FIG. 4A shows the case where the luminance level of the input-video signal S1 is observed in the horizontal direction and FIG. 4B shows the case where the luminance level of the video signal S4 is observed in the horizontal direction.

In comparison with FIGS. 4A and 4B, FIGS. 4C and 4D show the case where the basic blocks BLK are generated by extracting a high-frequency component alone from the input-video signal S1, and the basic blocks BLK are rearranged. In that case, the occurrence of the above-described gap is effectively prevented and noise particles can be reduced in size.

Therefore, in the pulverization-core unit 3, a low-pass filter (LPF) 5 extracts a low-frequency component from the input-video signal S1 and outputs the low-frequency component. A subtraction unit 6 subtracts the signal output from the low-pass filter 5 from the input-video signal S1, so that a high-frequency component S5 of the input-video signal S1 is output, as shown in FIG. 4C. A tiling unit 7 processes the high-frequency component S5 of the input-video signal S1, where the high-frequency component 5 is output from the subtraction unit 6, as is the case with the tiling unit 4, and outputs the processing result, as an output signal S6, as shown in FIG. 4D. An addition unit 8 adds the signal output from the low-pass filter 5 to the output signal S6 of the tiling unit 7, whereby the basic blocks BLK are generated and rearranged only for the high-frequency component. Then, the addition unit 8 outputs a video signal S7 generated based on the generated and rearranged basic blocks BLK, as shown in FIG. 4E.

Although the video signal S7 output from the addition unit 8 effectively prevents the gap occurrence, the low-frequency component is subjected to no processing. Therefore, each of noise particles included in the low-frequency component is still large in size, which makes noises noticeable. On the other hand, noise particles of the video signal S4 output from the tiling unit 4 are reduced in size so that the noise particles of a low-frequency component are reduced in size. Therefore, even though the noises are unnoticeable, the gap may occur.

Therefore, the pulverization-core unit 3 subjects the above-described video signals S4 and S7 to load addition and outputs data on the load-addition result. Further, the pulverization-core unit 3 controls a blend ratio α, which is the load-addition ratio used for performing the load addition, based on the gap size, so as to effectively prevent the gap occurrence and reduce the noise particles in size. Therefore, a gap-control unit 10 provided in the pulverization-core unit 3 detects the gap degree indicating the gap size from the video signal S4 output from the tiling unit 4, and determines the blend ratio a according to the gap degree.

Figures 5, 6:
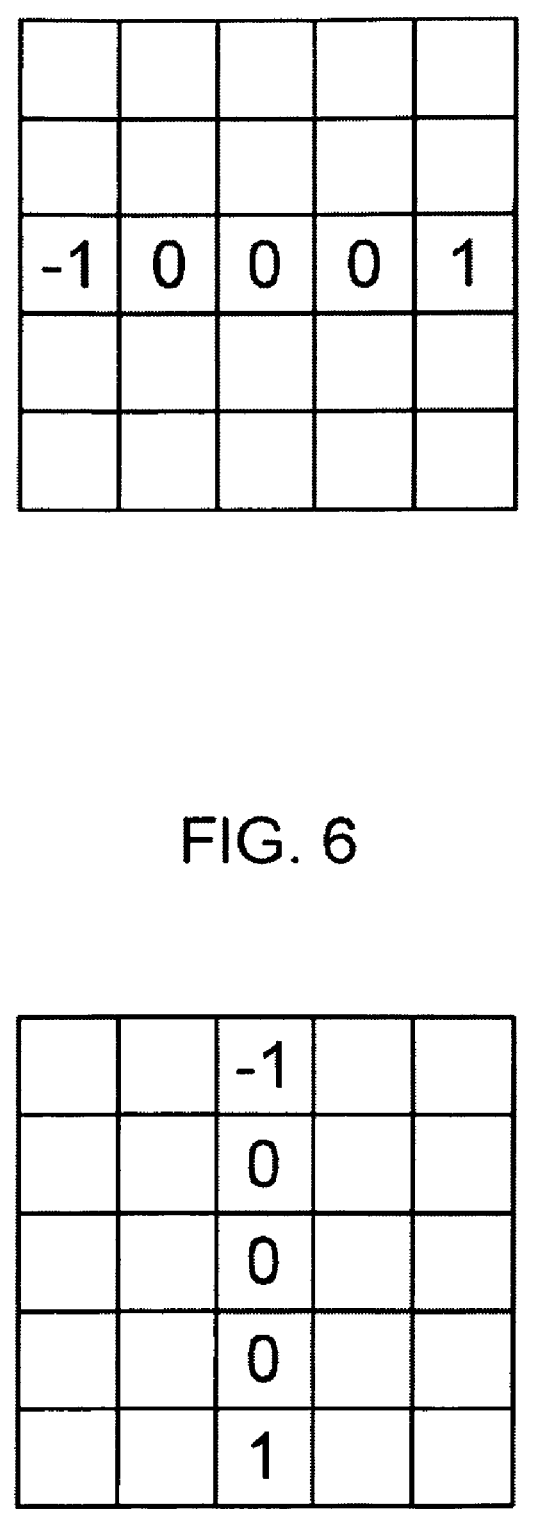

Namely, a gap-detection unit 11 provided in the gap-control unit 10 detects the magnitude of a change in the level of the video signal S4 output from the tiling unit 4, where the signal level changes in the horizontal direction and the vertical direction, so that the gap degree is detected. More specifically, the gap-detection unit 11 includes a horizontal-direction filter configured to detect the magnitude of the signal-level change, where the horizontal-direction filter is used for five pixels that are continuously arranged in the horizontal direction and centered on a target pixel, as shown in FIG. 5. The gap-detection unit 11 further includes a vertical-direction filter configured to detect the magnitude of the signal-level change, where the vertical-direction filter is used for five pixels that are continuously arranged in the vertical direction and centered on the target pixel, as shown in FIG. 6. Then, as shown in Equation (1), the gap-detection unit 11 changes output values of the above-described two filters into absolute values and adds the absolute values to each other. Further, the gap-detection unit 11 adds the value of the addition result to the value of a result of addition performed for neighboring pixels in the above-described manner so that the gap degree is detected. In that case, the neighboring pixels are pixels adjacent to the target pixel and/or the pixels corresponding to the number of taps of each of the horizontal-direction filter and the vertical-direction filter, for example.

[Expression 1]

$$\text{Gap degree} = \Sigma(|\text{horizontal-filter output}| + |\text{vertical-filter output}|) \quad (1)$$

According to characteristics shown in FIG. 7, a blend-ratio-generation unit 12 calculates and outputs the blend ratio α based on the gap degree so that the ratio of the video signal S4 to the video signal S7 becomes small as the change in the level of the video signal S4 becomes significant, that is to say, as the gap size increases, where the signal level changes in the horizontal direction and the vertical direction.

A gap-blend unit 13 subjects the video signals S4 and S7 to weighted summation at the blend ratio α and outputs a video signal S9, as shown by Equation (2). According to Equation (2), each of pixel values of the video signals S4, S7, and S9 is indicated by the reference numeral of the corresponding video signal.

[Expression 2]

$$S9 = \alpha \cdot S4 + (1-\alpha) \cdot S7 \quad (2)$$

Here, the video signal S9 generated in the above-described manner causes a visual sensation such as showing multiple edges. Therefore, the pulverization unit 2 subjects the original input-video signal S1 and the video signal S9 to load addition, outputs data on a result of the load addition, and controls a blend ratio β used for the load addition based on the edge extent so that the visual sensation of the multiple edges is effectively avoided. Therefore, an edge-control unit 15 provided in the pulverization unit 2 detects the edge degree indicating the magnitude of the edge from the original input-video signal S1 and determines the blend ratio β according to the edge degree.

Figures 9, 10:
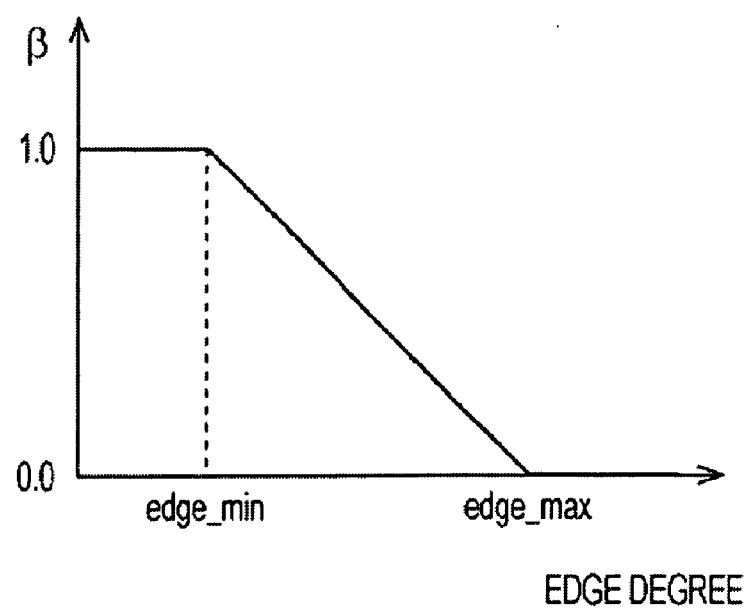
FIG. 9 is a schematic diagram showing the characteristics of a vertical-direction filter of the edge-detection unit.
FIG. 10 is a characteristic-line graph illustrating operations of a blend-ratio-generation unit provided in an edge-control unit of the image-processing device illustrated in FIG. 1.

Namely, an edge-detection unit 16 provided in the edge-control unit 15 detects the magnitude of an abrupt change in the signal level from the original input-video signal S1, where, the signal level changes in the horizontal direction and the vertical direction, and detects the edge degree indicating the certainty of the edge based on the change magnitude. More specifically, the edge-detection unit 16 detects a filter-output value indicating a pixel-difference value showing the magnitude of an edge occurring in a horizontal direction by using a Sobel filter configured to perform filtering in the horizontal direction, as shown in FIG. 8, and a filter-output value indicating a pixel-difference value showing the magnitude of an edge occurring in a vertical direction by using a Sobel filter configured to perform filtering in the vertical direction, as shown in FIG. 9. Further, the edge-detection unit 16 changes each of the above-described two filter-output values into an absolute value, selects the filter-output value larger than the other, and determines the selected larger value to be the edge degree.

According to characteristics shown in FIG. 10, a blend-ratio-generation unit 17 calculates and outputs the blend ratio β based on the above-described edge degree so that the ratio of the original input-video signal S1 to the video signal S9 increases as the edge corresponding to a change in the luminance value becomes steeper.

An edge-blend unit 18 subjects the input-video signal S1 and the video signal S9 to the weighted summation at the above-described blend ratio β and outputs a video signal S3, as shown by Equation (3). According to Equation (3), each of pixel values of the video signals S1, S9, and S3 is indicated by the reference numeral of the corresponding video signal.

[Expression 3]

$$S3=\beta \cdot S9+(1-\beta)\cdot S1 \quad (3)$$

The image-processing device 1 generates the video signal S3 with unnoticeable noises by performing the processing corresponding to Equation (3). However, since the noises of the video signal S3 are far more unnoticeable than those of the original input-video signal S1, the user may feel inconsistency.

Therefore, the image-processing device 1 distributes the values of differences between the input-video signal S1 of the target pixel and the video signal S3 obtained through the processing corresponding to Equation (3) to surrounding pixels so that error diffusion is achieved. Subsequently, the change in the pixel value of the video signal S3 is brought near to the change in the pixel value of the input-video signal S1.

That is to say, a subtraction unit 19 provided in the image-processing device generates and outputs the values of the differences between the video signal S3 output from the edge-blend unit 18 and the original-input video signal S1.

Figure 11:
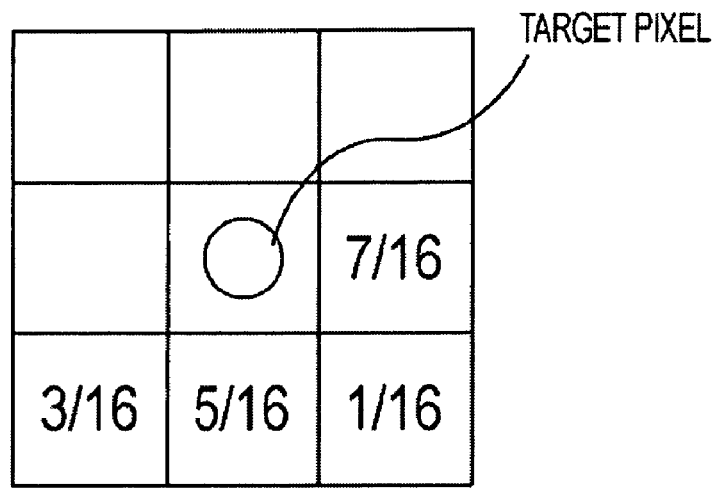
FIG. 11 is a schematic diagram showing the characteristics of an error filter of the image-processing device 1 illustrated in FIG. 1.
Figure 12:
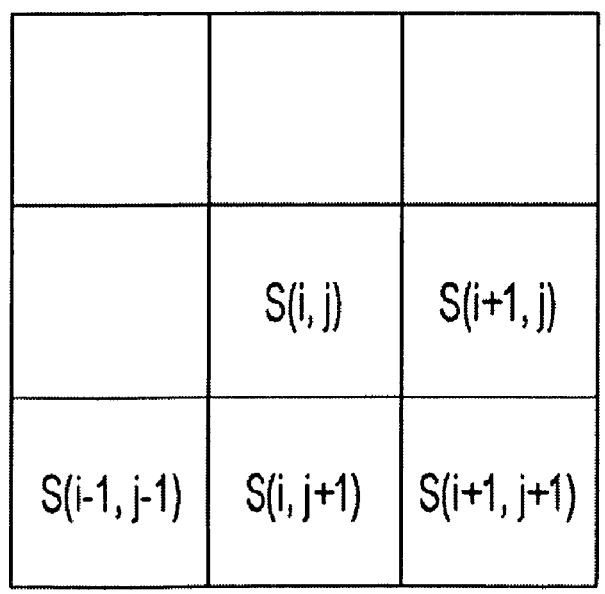
FIG. 12 is a schematic diagram illustrating processing performed by the error filter.

An error filter 20 distributes the difference values, that is, difference signals to the surrounding pixels so that the error diffusion is achieved. More specifically, the error filter 20 includes a Floyd & Steinberg filter having characteristics shown in FIG. 11, and calculates the pixel values distributed to the surrounding pixels by using the Floyd & Steinberg filter, as shown by Equations (4). However, the error diffusion may be achieved by using various types of filters other than the Floyd & Steinberg filter.

[Expression 4]

$$error=S1(i,j)-S3(i,j)$$

$$S10(i+1,j)=7/16 \text{ error}$$

$$S10(i-1,j+1)=3/16 \text{ error}$$

$$S10(i,j+1)=5/16 \text{ error}$$

$$S10(i+1,j+1)=1/16 \text{ error} \quad (4)$$

Here, the term S1(i, j) denotes the pixel value of the video signal S1 corresponding to the target value arranged at the position (i, j) and the term error denotes the difference value of the target pixel, where the difference value is output from the subtraction unit 19. Further, the terms S(i+1, j), S (i−1, j+1), S (i, j+1), and S (i+1, j+1) are pixel values distributed to the surrounding pixels based on the difference value of the target pixel.

A subtraction unit 22 subtracts a signal S10 output from the error filter 20 from the original input-video signal S1 and outputs a video signal S11. Subsequently, the image-processing device 1 stores edge information, prevents the gap occurrence, and outputs the video signal S11 with noise particles reduced in size.

When the video signal S11 with the noise particles reduced in size is output, high-frequency components other than noises of the input-video signal S1 can be displayed at high resolution. Therefore, the image-processing device 1 subjects the video signal S11 with the noise particles reduced in size and the original input-video signal S1 to the load addition and outputs data on the load-addition result. Further, the image-processing device 1 controls a blend ratio γ used for performing the load addition based on the flatness of the input-video signal S1, so as to avoid the deterioration of the high-frequency components.

That is to say, a flat-detection unit 24 detects the flatness from the input-video signal S1. More specifically, the flat-detection unit 24 extracts the high-frequency components from the input-video signal S1 by using a high-pass filter or the like, detects the power of the high-frequency components, and subtracts the power value from a predetermined value so that the flatness is detected. Here, the flatness detection can be achieved according to various methods, such as using the horizontal-direction filter and the vertical-direction filter, as is the case with the gap-detection unit 11.

According to characteristics shown in FIG. 13, a blend-ratio-generation unit 25 calculates and outputs the blend ratio γ based on the above-described flatness so that the ratio of the input-video signal S1 increases as the flatness of the flat portion increases.

A flat-blend unit 26 subjects the input-video signal S1 and the video signal S11 to the weighted summation at the above-described blend ratio γ, and outputs the video signal S2, as shown by Equation (5). In Equation (5), each of pixel values of the video signals S1, S11, and S2 is indicated by the reference numeral of the corresponding video signal.

[Expression 5]

$$S2=\gamma \cdot S11+(1-\gamma)\cdot S1 \quad (5)$$

(2) Operations of First Embodiment

According to the above-described configurations, the pulverization-core unit 3 divides the video signal S1 which is to be processed into blocks BL and reduces the size of each of the blocks BL so that the basic blocks BLK are generated, as shown in FIGS. 2 and 3. Further, the basic blocks BLK are arranged into the original blocks BL so that the video signal S9 is generated. The video signal S9 corresponds to a processed image generated by reducing the size of each of the noise particles of the input image generated based on the video signal S1. Subsequently, in the image-processing device 1 according to the first embodiment, the noise-particle size of the video signal S9 is smaller than that of the video signal S1. Therefore, it becomes possible to make noise particles that can be removed by the two-dimensional filter or the like with difficulty unnoticeable. That is to say, the above-described image-processing device 1 can make noises more unnoticeable than ever.

However, when the basic blocks BLK are generated by reducing the size of each of the blocks BL, and rearranged into the original blocks BL so that the size of each of the noise particles is reduced, various problems occur.

Therefore, the tiling unit 4 of the pulverization-core unit 3 divides the input-video signal S1 into blocks so that the blocks corresponding to the entire frequency band are generated, where the image information corresponding to the entire-frequency band is stored in the blocks. Further, the blocks corresponding to the entire-frequency band are reduced to the basic blocks corresponding to the entire-frequency band, and the basic blocks are rearranged into the original blocks, so that each of the noise particles of the input-video signal S1 is reduced in size, where the noise particles are scattered over the entire frequency band of the input-video signal S1. Subsequently, the video signal S4 is generated.

Here, each of the noise particles of the video signal S4 generated in the above-described manner can be reduced in size with efficiency. However, if the luminance gradient occurs in the input-video signal S1, the gap occurs, as shown in FIG. 4B, so that the borders between the basic blocks become noticeable.

Then, the high-frequency components of the input-video signal S1 are extracted through the processing performed by the low-pass filter 5 and the subtraction unit 6. After the tiling unit 7 processes the high-frequency components in the above-described manner, the high-frequency components are added to the low-frequency components of the input-video signal S1, where the low-frequency components are output from the low-pass filter 5. Subsequently, the video signal S7 is generated, where the video signal S7 is a signal generated by reducing the size of each of the noise particles of the high-frequency components alone, the high-frequency components being included in the input-video signal S1, as shown by FIG. 4E.

Although the video signal S7 generated in the above-described manner can reduce the gap occurrence, it is difficult to reduce the size of each of the noise particles of the low-frequency components.

Therefore, in the image-processing device 1, the gap-control unit 10 detects the gap size from the video signal S4. Further, the gap-blend unit 13 subjects the video signals S4 and S7 to the load addition based on the detection result so that the ratio of the video signal S7 increases as the gap size increases. Subsequently, the video signal S9 is generated.

That is to say, the image-processing device 1 can reduce the gap which occurs when the basic blocks BLK generated by reducing the blocks BL in size are rearranged into the original blocks BL so that the size of each of the noise particles is reduced, and reduce the size of each of noise particles scattered over a wide frequency band. Namely, the image-processing device 1 can make the noises more unnoticeable than ever with stability.

Further, the flat-detection unit 24 detects the flatness of the input-video signal S1. The input-video signal S1 and the video signal S11 generated by reducing the size of each of the noise particles are subjected to the load addition and data on a result of the load addition is output so that the ratio of the video signal S11 (S3) increases as the flatness of the input-video signal S1 increases.

Subsequently, in the image-processing device 1, configurations generated based on the high-frequency components originally included in the input-video signal are not reduced in size, so that the resolution achieved by the output-video signal S2 is prevented from being deteriorated and the image quality is prevented from being deteriorated.

Further, the subtraction unit 19 calculates error values, that is, the values of differences between the input-video signal S1 and the video signal S3 generated by reducing each of the sizes of the noise particles. Each of the error filter 20 and the subtraction unit 22 distributes the error values to the surrounding pixels so that the error diffusion is achieved. Subsequently, the output-video signal S2 is corrected, so as to make the difference between an image generated based on the output-video signal S2 and the input image generated based on the input-video signal S1 less significant, so as not to give the user the impression that the image is inconsistent.

(3) Advantage of First Embodiment

According to the above-described configurations, the input-image data is divided into blocks, the blocks are reduced in size so that basic blocks are generated, and the basic blocks are arranged into the original blocks so that the size of each of noise particles is reduced. Subsequently, it becomes possible to make noises more unnoticeable than ever.

Further, the basic blocks are generated for each of the entire frequency band and the high-frequency components of the input image so that the size of each of the noise particles is reduced. According to the size of a gap which occurs when the size of each of the noise particles is reduced for the entire-frequency band, signals including noise particles reduced in size for the above-described entire-frequency band and high-frequency components are subjected to the load addition. Subsequently, it becomes possible to prevent the gap occurrence with efficiency and make the noise more unnoticeable than ever.

Further, the signal including the noise particles reduced in size and the signal of the input image are subjected to the load addition according to the flatness of the input image and data on a result of the load addition is output. Subsequently, it becomes possible to reduce the size of each of the noise particles without changing the configurations achieved based on the high-frequency components originally included in the input-image data, so as to avoid the deterioration of the image quality with efficiency and make the noises more unnoticeable than ever.

Further, since the error values, that is, the values of differences between the input image and the output image are distributed to the surrounding pixels so that the error diffusion is achieved, the inconsistency caused by the processing result can be efficiently avoided.

Second Embodiment

According to the above-described embodiment, the input-video signal is processed so that the input-image data generated based on video data is processed. According to another embodiment of the present invention, however, still-image data can be processed.

Further, according to the above-described embodiment, the blend-ratio-generation units 12, 17, and 25 generate the blend ratios α, β, and γ, respectively, based on the fixed characteristics. According to another embodiment of the present invention, however, the characteristics of the blend-ratio-generation units 12, 17, and 25 may be varied directly through the user operation, or varied indirectly by making the input value variable. In that case, the quality of an image generated based on the output-video signal S2 can be adjusted so that image quality desired by the user is achieved. Particularly, when the still-image data is processed, the characteristics of each of the blend-ratio-generation units 12, 17, and 25 are controlled according to the still-image data which is to be processed so that the quality of the still image can be adjusted in detail.

Further, according to the above-described embodiment, the error filter achieves the error diffusion and the flat-blend unit blends the pixel values of the input image with those of the output image, for example. However, without being limited to the above-described embodiment, the above-described processing procedures may not be performed, or may be performed in any desired order so long as characteristics adequate enough for practical use are provided.

Further, according to the above-described embodiment, the image-processing device is configured, as hardware. However, the functions of the image-processing device may be achieved by executing a predetermined program through a digital-signal processor, a computer, etc., according to another embodiment of the present invention. The program may be installed on the digital-signal processor, the computer, etc., in advance, or recorded onto a recording medium including an optical disk, a magnetic disk, a memory card, etc. Further, the program may be downloaded via a network such as the Internet, so as to be presented to the user.

It should be understood by those skilled in the art that various modifications, combinations, sub-combinations and alterations may occur depending on design requirements and other factors insofar as they are within the scope of the appended claims or the equivalents thereof.

What is claimed is:

1. An image-processing device comprising:
a pulverization-core unit configured to divide data on an input image into blocks, generate basic blocks by reducing each of the blocks in size, and arrange the basic blocks into their corresponding blocks so that data on a processed image including at least one noise particle of the input-image data is generated, where the noise particle included in the processed-image data is reduced in size;
an edge-detection unit configured to detect an edge certainty degree from the input-image data; and
an edge-blend unit configured to subject a pixel value of the input-image data and a pixel value of the processed-image data to a blend ratio and output data on an output image based on a result of the detection performed by the edge-detection unit so that a weight to the pixel value of the input-image data increases as the edge certainty degree increases.

2. The image-processing device according to claim 1, wherein the pulverization-core unit includes:
a first tiling unit configured to divide the input-image data into blocks so that blocks of an entire frequency band are generated, reduce each of the blocks in size so that basic blocks of the entire frequency band are generated, and arrange the basic blocks into their corresponding blocks, whereby the noise particle of the input-image data is reduced in size and data on a first intermediate-processed image is generated;
a filter unit configured to extract at least one high-frequency component from the input-image data;
a second-tiling unit configured to divide the extracted high-frequency component into blocks so that blocks of the high-frequency component are generated, reduce the size of each of the high-frequency-component blocks so that basic blocks of the high-frequency component are generated, and arrange the high-frequency-component-basic blocks into their corresponding high-frequency-component blocks, whereby at least one noise particle included in the high-frequency component is reduced in size;
an addition unit configured to generate data on a second intermediate-processed image by adding a value output from the second tiling unit to at least one low-frequency component of the input-image data;
a gap-detection unit configured to detect a size of a gap from the first intermediate-processed-image data; and
a gap-blend unit configured to subject at least one pixel value of the first intermediate-processed-image data and at least one pixel value of the second intermediate-processed-image data to the blend ratio and generate the processed-image data based on data on a result of the detection performed by the gap-detection unit so that a proportion of the at least one pixel value of the second intermediate-processed-image data increases as the gap size increases.

3. The image-processing device according to claim 1, further comprising:
a flatness-detection unit configured to detect flatness from the input-image data; and
a flat-bend unit configured to subject the pixel value of the input-image data and at least one pixel value of the output-image data output from the edge-blend unit to the blend ratio and correct the pixel value of the output-image data based on a result of the detection performed by the flatness-detection unit so that a proportion of the pixel value of the output-image data output from the edge-blend unit increases as the flatness increases.

4. The image-processing device according to claim 1, further comprising an error-diffusion unit configured to distribute at least one error value of the pixel value of the output-image data output from the edge-blend unit to at least one surrounding pixel, where the error value is a value of a difference between the pixel value of the input-image data and the pixel value of the output-image data.

5. An image-processing method comprising using an image-processing apparatus to perform the steps of:
at a pulverization-core unit, dividing data on an input image into blocks, generating basic blocks by reducing each of the blocks in size, and arranging the basic blocks into their corresponding blocks so that data on a processed image including at least one noise particle of the input-image data is generated, where the noise particle included in the processed-image data is reduced in size;
at an edge-detection unit, detecting an edge certainty degree from the input-image data; and
at an edge-blend unit, subjecting a pixel value of the input-image data and a pixel value of the processed-image data to a blend ratio and outputting data on an output image based on a result of the detection performed at the edge-detection step so that a weight to the pixel value of the input-image data increases as the edge certainty degree increases.

6. A non-transitory computer-readable recording medium storing a program, which, when executed by a processor, causes a computer to perform an image-processing method provided to process data on an input image, the program comprising the steps of:
dividing the input-image data into blocks, generating basic blocks by reducing each of the blocks in size, and arranging the basic blocks into their corresponding blocks so that data on a processed image including at least one noise particle of the input-image data is generated, where the noise particle included in the processed-image data is reduced in size;

detecting an edge certainty degree from the input-image data; and subjecting a pixel value of the input-image data and a pixel value of the processed-image data to a blend ratio and outputting data on an output image based on a result of the detection performed at the edge-detection step so that a weight to the pixel value of the input-image data increases as the edge certainty degree increases.

\* \* \* \* \*